United States Patent [19]

Wears

[11] Patent Number: 4,561,279
[45] Date of Patent: Dec. 31, 1985

[54] ROD BENDING AND CUTTING APPARATUS

[76] Inventor: Leonard Wears, 6775 32nd St. N., St. Petersburg, Fla. 33702

[21] Appl. No.: 643,692

[22] Filed: Aug. 24, 1984

[51] Int. Cl.[4] .............................................. B21D 7/02
[52] U.S. Cl. ........................................ 72/218; 72/217; 72/294; 30/296 A; 83/597; 83/601
[58] Field of Search ................. 72/294, 217, 387, 388, 72/444, 321, 129, 218; 30/296 R, 296 A; 83/597, 601-609, 599, 600

[56] References Cited

U.S. PATENT DOCUMENTS

| | | | |
|---|---|---|---|
| 2,620,848 | 12/1952 | DePaoli | 72/217 |
| 2,801,691 | 8/1957 | Glass | 83/601 |
| 3,004,458 | 10/1961 | Dvorak | 83/601 |
| 3,424,046 | 1/1969 | Trautmann | 83/597 |
| 3,901,292 | 8/1975 | Simich | 72/217 |

FOREIGN PATENT DOCUMENTS 816048 10/1951 Fed. Rep. of Germany ........ 72/217

Primary Examiner—W. D. Bray
Attorney, Agent, or Firm—Walter J. Monacelli

[57] ABSTRACT

Apparatus for effectively and efficiently cutting and bending rods, used for instance in lintels, footers, and slabs, comprising a portable workbench having suitably secured on the table thereof bending and cutting assemblies, hydraulic power cylinders for actuating the assemblies, and suitable controls for ease of operation of the assemblies. The cutting assembly includes a stationary cutter disposed in a vertical position on the table top adapted to be engaged by a vertical rotatably moved cutter for the shearing of rods with the rods disposed in horizontal position on the table top. The bending assembly includes a pair of vertically mounted spaced apart cylindrical members or posts with one of said members rotatably mounted in the table top such that rotation of said one member with a rod disposed between said member is effective to bend the rod. An adjustable abutment against which a portion of the rod is adapted to bear is also mounted on the table top disposed a short distance from the cylindrical members unit.

8 Claims, 5 Drawing Figures

ROD BENDING AND CUTTING APPARATUS

BACKGROUND OF THE INVENTION

1. Field of the Invention

The invention relates to apparatus for effectively and quickly bending and cutting rods.

2. State of the Prior Art

U.S. Pat. Nos. 2,620,848, 3,861,186 and 4,052,875 are representative of mechanisms relative hereto.

Although similarities exist between the prior art and the present invention it is believed that simplicity presented herein is the key to the difference and the basis for patentability. Both the cutter and bender portions of this apparatus are not only simple but effective and efficient. By reason of arranging the basic bending unit as a single pivotal member, the rod can be quickly and easily received and bent in a matter of a few seconds. With the unit pivotally mounted on the table top of a workbench it is easily accessible in use thereof by an operator. The cutter unit likewise arranged on the table top permits of ease in placing the rod in position for cutting either before or after the bending thereof. Transfer of the rod from cutter to bender is a simple quick operation by a single operator with the control levers for operation of these units mounted on the workbench near the table top thereof. Furthermore, the bender includes an adjustable rod abutment member for incremental degree adjustment of the bend desired in the rod.

The cutting unit includes a stationary cutter blade and movable cutter blade pivotally mounted to swing through an opening in the table top effective to shear a rod placed on the table top and received in the cutter jaw of the cutter unit.

A careful comparison of the prior art to the present invention will readily identify the above features of patentability.

SUMMARY OF THE INVENTION

The rod bending and cutting apparatus covered hereby is in the form of a portable unit having all necessary elements for performing the desired results mounted on a wheel equipped workbench. Whereas the power mechanisms for operating the cutter and bender units are disposed in the base of the workbench, the cutter and bender units are mounted on the table top of the bench for easy access to an operator of the apparatus. The cutter unit includes a stationary cutter blade mounted in a holder on the table top with cutting edge of the blade extending vertically above the table top. A movable cutter blade is secured to a power actuated arm pivotally mounted on the aforesaid holder so as to permit movement of the movable blades into shear arrangement with the stationary cutter blade effective to quickly and easily cut a rod laid on the table top and in a position between the cutter blades prior to a cutting operation movement of the movable cutting blade. The power actuated arm upon which the movable cutter blade is mounted is adapted to be actuated by a hydraulic power cylinder.

The bender unit as mounted on the table top includes a rod bending element in the form of rotatable member having a pair of spaced apart vertically extending cylindrical members secured thereto for movement as an integral unit. One cylindrical member fixedly secured to the rotatable member has a downward vertically extending portion pivotally mounted on the table top with the end extremity attached to a crank arm adapted to be actuated by a hydraulic power cylinder. A rod abutment or block is associated with the rotatable member in that the rod to be bent bears against the abutment during a rotating bending action of the rotatable member. The abutment is adjustable through a predetermined limited movement so as to accurately bend the rod to desired angular position.

So as to easily and quickly control the operation of the cutter and bender units the operator has at his disposal side-by-side lever controlled valves operable as the particular cutting or bending operation to be performed.

DESCRIPTION OF THE PREFERRED EMBODIMENT

Figure 1:
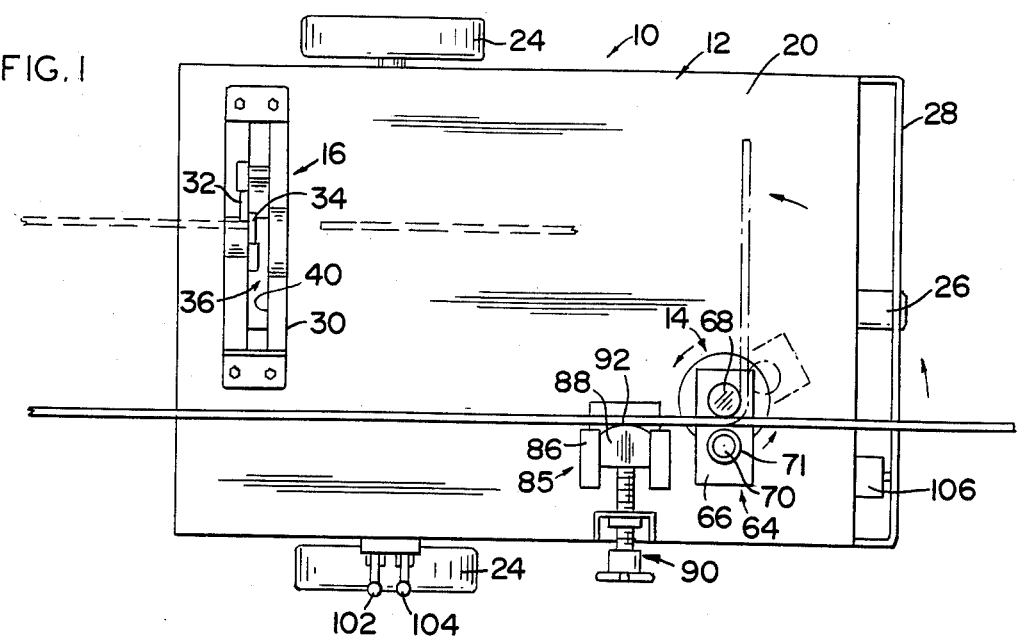
FIG. 1 is a top plan view of the cutter and bender apparatus.
Figure 2:
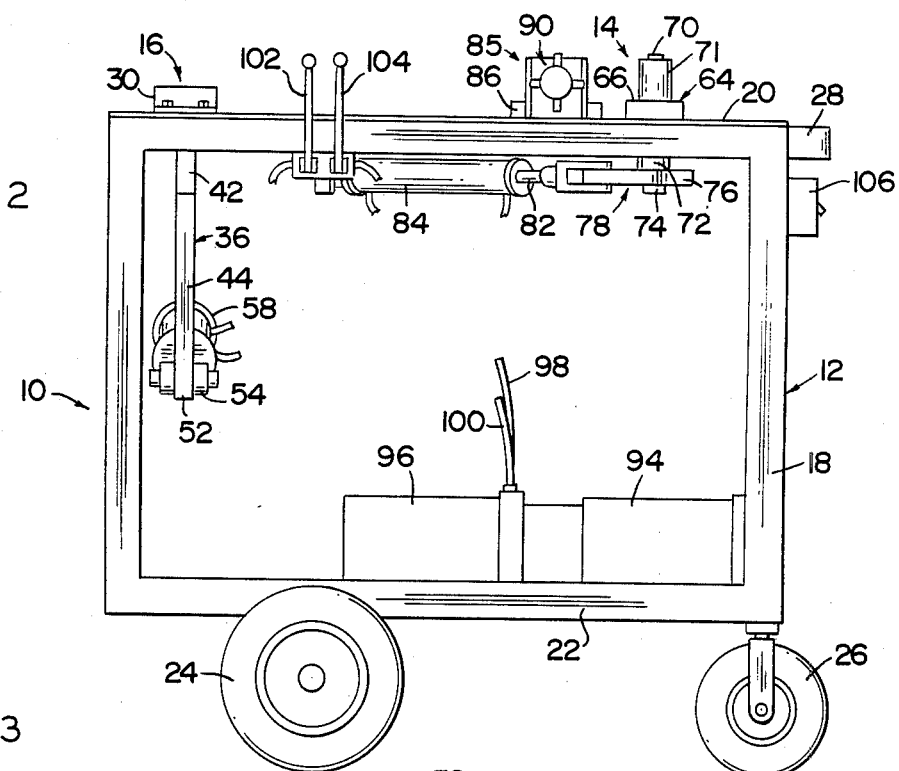
FIG. 2 is a side plan view of the apparatus of FIG. 1.

An apparatus 10 includes a workbench 12 having a rod bending assembly 14 and a rod cutting assembly 16 mounted thereon. Workbench 12 has a frame 18, a table top 20, a base member 22, a set of wheels 24, a nose wheel 26 and a handle 28.

Figure 3:
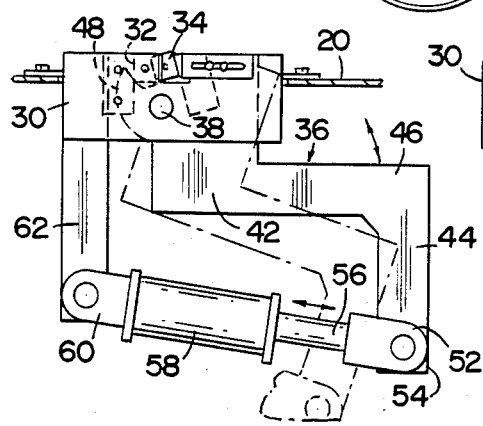
FIG. 3 is a side plan view of the cutter unit together with dotted line operational position of the cutter mechanism.
Figure 3A:
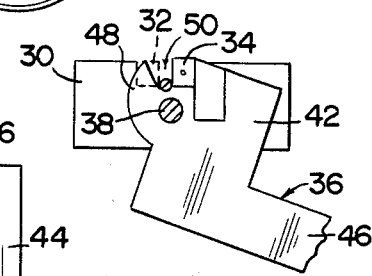
FIG. 3A is a partial side plan view of the movable cutter structure of FIG. 3.
Figure 4:
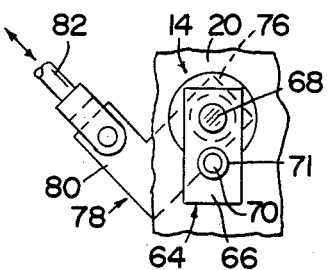
FIG. 4 is a partially cut-away top plan view of the bender member.

Cutting assembly 16 is secured firmly on table top 20 and includes a support frame 30 bolted to the table top, a stationary cutter 32 fixedly secured to the support frame, and a movable cutter 34. Cutter 34 is fixedly secured to a crank arm 36 pivotally mounted on support frame at 38 and is swingingly movable through an opening in the table top and an opening 40 provided centrally of support frame 30. The crank arm 36 includes an arm 42 on which the cutter 34 is secured, an arm 44, and a member 46 connecting the arms. Arm 42 as seen in FIGS. 3 and 3A has a portion 48 providing cutter 34 with a slot or opening 50, the purpose of which will hereinafter appear. The extremity 52 of arm 44 is connected by appropriate pivotal fitting 54 to the actuating stroke shaft 56 of a hydraulic cylinder 58. The hydraulic cylinder 58 at its end 60 opposite from shaft 56 has a suitable pivotal connection secured to a bracket 62 forming a fixed part of workbench 12.

As viewed in FIG. 1, cutters 32 and 34 are shown in position after a cutting operation wherein the cutter 34 has moved in a close proximity shear position relative to cutter 32.

Bending assembly 14 includes a rectangular-shaped plate 64 having fixedly secured on the upper side 66 thereof spaced-apart vertically arranged cylindrical members or posts 68 and 70. Member 70 has a smaller diameter than member 68 and has a sleeve or rotatable bearing member 71 received thereon. Cylindrical member 68 as secured on plate 64 includes a vertically downwardly extending portion 72 pivotally supported on table top 20 with plate 64 disposed to move horizontally across the table top. Portion 72 of member 68 is rigidly secured at 74 to one end 76 of a crank arm 78, whereas arm 80 of the crank arm is suitably pivotally connected to the actuating shaft 82 of a hydraulic cylinder 84. Cylinder 84 has its opposite end from shaft 82 pivotally mounted to the underside of table top 20.

A rod abutment or block assembly 85 mounted on the table top includes a support frame 86, a rod engaging movable member 88, and an adjustable mechanism 90 for suitably adjusting the horizontal movement of member 88. As viewed in FIG. 1 end face 92 of member 88 is adapted to have a rod to be bent rested against it whereas the cylindrical member 68 and sleeve 71 has the portion of the rod to be bent disposed therebetween.

An electrical motor 94 such for example of one horse power rating and a hydraulic pump 96 driven by the motor are secured on base member 22. Suitable hydraulic lines 98 and 100 are to be appropriately connected through lever controlled valves 102 and 104 for the operative utilization of hydraulic cylinders 58 and 84 in actuation of cutting assembly 16 and bending assembly 14. A switch 106 controls operation of motor 94 supplied from an appropriate electrical power source.

OPERATIONAL USE OF THE APPARATUS

With switch 106 in ON position and the electric motor 94 and pump 96 in operation, the respective cutting and bending units are ready to perform their intended functions as controlled by fluid power flow through the actuation of lever controlled valves 102 and 104.

As seen in FIG. 1 a rod to be bent is disposed extending between cylindrical member 68 and sleeve 72 and with another portion thereof bearing against end 92 of abutment 88. With the rod appropriately positioned in predetermined desired area bending location, lever controlled valve is actuated effective to provide for pressure fluid to be delivered from pump 96 to hydraulic cylinder 84 and cause movement of cylinder shaft 82 and crank arm 78. Rotation of arm 64 about pivot point of piston 76 of member 68 results in sleeve 71 engaging the rod and forcing it against and around member 68 whereas sleeve 70 revolves about member 70 in rolling engagement against the rod. As the crank arm 78 is further moved the sleeve 71 and member 70 follow an arcuate path, the extent of movement thereof determining the angle to which the rod is bent. The shaft 82 and crank arm 78 as actuated by cylinder 84 are so designed as to permit a pipe bend to the extent of 95°. With the conclusion of actuation of cylinder 84 and bending of the rod to the extent viewed in dotted lines of FIG. 1, a slight further bending of the rod is possible by advancing the abutment 88 against the portion of the rod bearing thereon through adjustment mechanism 90 manual operation while the bent rod is maintained between member 68 and sleeve 71. With the conclusion of the bending operation the bent rod is removed and the plate 64, member 68 and sleeve 71 are, through a retracted controlled operation of cylinder 84, returned to their normal at-rest position. As an example of the effective and efficient operation of the bending assembly, it is possible to bend approximately 1,000 ⅝" 40-grade steel rods in 5 hours.

Simultaneously with the operation of the bending assembly the cutting assembly is effective to cut approximately 800 rods of above size and quality in the same period of 5 hours.

FIGS. 3 and 3A illustrate the positioning and cutting of rods wherein in FIG. 3A the cutter 34 is in its normal at-rest position and provides space 50 between arm 48 and cutter 34 for receiving the rod therein preparatory to the cutting thereof. As noted by dotted lines in FIG. 1, the rod has already been severed in that the cutters 32 and 34 are shown in overlapped position.

With the rod laid on table top 20 and received in space 50 between cutters 32 and 34, manipulation of lever controlled valve 102 results in the fluid power operation of cylinder 58 and the resultant movement of shaft 56 and crank arm 36. With the pivot of crank arm 36 at 38 and the disposition of arm a remote distance from pivot 38 in relation to the distance of cutter 34 therefrom, a high level ratio is provided such that the cutting force of cutters 32 and 34 in being moved relative to one another in a shearing action is able to quickly, easily and effectively cut the rod. With the appropriate operation of control valve 102 rods can readily be positioned between the cutters for the cutting and subsequent removal thereof.

Apparatus 10 through the portability thereof can be readily moved to any desired location where the rods to be worked on are available and the self-contained nature of the workbench with all necessary equipment available can perform the necessary bending and cutting operations in quick, effective fashion.

It is to be appreciated that while the description is specific to the disclosures presented, variations in structure are conceivable within the scope of the aforesaid description and accordingly, the appended claims are intended to define same.

My invention is thus claimed as follows:

1. Rod cutting and bending apparatus comprising a workbench, a cutting assembly mounted on the top of the workbench, a bending assembly mounted on the top of the workbench, said cutting assembly having a movable cutter, said bending assembly having a rotatable member, means for actuating said movable cutter and rotatable member, a power package mounted on said workbench for operating said actuating means, and means for controlling the power flow from said power package to said actuating means.

2. An apparatus according to claim 1, wherein said workbench includes a table top and base plate with the cutting and bending assemblies arranged in spaced relation on said table top, and wherein the power package is fixedly secured on said base plate.

3. An apparatus according to claim 2, wherein said workbench is portable and said actuating means includes separate power actuated cylinders for each of said movable cutter and rotatable members.

4. Rod cutting and bending apparatus comprising a workbench having a table top, a cutting assembly mounted on said table top, a bending assembly mounted on said table top, said cutting assembly including a fixed cutter blade and a movable cutter blade, said fixed cutter blade arranged above the surface of said table top with a cutting edge thereof disposed vertically, said movable cutter blade mounted upon a pivotal member near one end thereof and movable with said member in a vertical arcuate movement in shear engaging relation to said fixed cutter blade, said bending assembly including a member pivotally supported for movement in a horizontal plane across the surface of the table top and having a pair of cylindrical members spaced apart and arranged to extend vertically upward from the upper face of said pivotally supported member, and manual means for the controlled operation of said pivotal member and said member supported for movement in a horizontal plane.

5. An apparatus according to claim 4, wherein a power supply mechanism is fixedly mounted on said workbench, a pair of power actuated units, one powered from said power supply mechanism for actuating each of said pivotal members for said cutting and bending assemblies.

6. A rod bending apparatus comprising a workbench having a table top and a bending assembly comprising a member in the form of a plate, pivotal on and movable across the table top, having a pair of spaced apart cylindrical posts fixedly secured on the upper surface thereof and having their axes extending vertically upward with the axis of one post, disposed a further distance from the pivot position of the plate than said other post, having a rotatable bearing sleeve thereon, a power mechanism having a part thereof fixedly attached to the pivot of the plate for the rotation thereof, and an adjustable abutment mounted on the table top in close spaced proximity to the pivotal plate, including a pressure element adapted to bear against a rod being bent, a screw attached to said pressure element and a bracket secured to the plate having the screw adjustably supported thereon.

7. A rod cutting apparatus comprising a table top, a cutting assembly mounted on the table top, including a stationary frame with the frame and top having an opening extending therethrough, a stationary cutter secured on the frame, a member pivotably mounted on the frame and movable through the opening having an arm adjacent the opening and an arm at its opposite end remove from the pivot point, providing at the arm adjacent the opening and normally positioned at rest in the opening, a V-shaped slot, for receiving a rod to be bent, a cutter, secured on the arm on one side of the V-shaped slot, vertically and arcuately movable into engaging position relative to the stationary cutter and power means for actuating the member and the cutter secured on the one arm thereof.

8. A cutting apparatus according to claim 7, wherein said power means is mounted on the underside of said table top with the power actuator end thereof pivoted on said arm remote from said adjacent arm of said pivoted member.

* * * * *